(12) United States Patent
Hübner

(10) Patent No.: US 11,927,213 B2
(45) Date of Patent: Mar. 12, 2024

(54) JOINT

(71) Applicant: PHYSIK INSTRUMENTE (PI) GMBH & CO. KG, Karlsruhe (DE)

(72) Inventor: Reinhard Hübner, Waldbronn (DE)

(73) Assignee: PHYSIK INSTRUMENTE (PI) GMBH & CO. KG, Karlsruhe (DE)

(*) Notice: Subject to any disclaimer, the term of this patent is extended or adjusted under 35 U.S.C. 154(b) by 687 days.

(21) Appl. No.: 16/628,488

(22) PCT Filed: Jul. 4, 2018

(86) PCT No.: PCT/DE2018/100611
§ 371 (c)(1),
(2) Date: Jan. 3, 2020

(87) PCT Pub. No.: WO2019/007463
PCT Pub. Date: Jan. 10, 2019

(65) Prior Publication Data
US 2020/0182289 A1 Jun. 11, 2020

(30) Foreign Application Priority Data

Jul. 5, 2017 (DE) .................. 10 2017 115 050.1

(51) Int. Cl.
*F16C 11/12* (2006.01)
(52) U.S. Cl.
CPC ............. *F16C 11/12* (2013.01); *Y10T 403/45* (2015.01); *Y10T 403/54* (2015.01)
(58) Field of Classification Search
CPC ... B23Q 1/32; B23Q 1/34; B23Q 1/36; B23Q 1/44; Y10T 403/32041; Y10T 403/32557;
(Continued)

(56) References Cited

U.S. PATENT DOCUMENTS 2,793,028 A 5/1957 Wheeler
3,181,918 A * 5/1965 Troeger .................. F16C 11/12
403/291

(Continued)

FOREIGN PATENT DOCUMENTS

CN 1820182 A 8/2006
CN 2818898 Y 9/2006
(Continued)

OTHER PUBLICATIONS

First Office Action dated Jul. 22, 2021, by the Chinese Patent Office in corresponding Chinese Patent Application No. 201880044883.2, and an English Translation of the Office Action. (10 pages).
(Continued)

*Primary Examiner* — Amber R Anderson
*Assistant Examiner* — Kevin J Baynes
(74) *Attorney, Agent, or Firm* — BUCHANAN INGERSOLL & ROONEY PC

(57) ABSTRACT

The disclosure relates to a joint, which has at least three degrees of rotational freedom, having a rigid carrier element and at least two elastically deformable joint elements formed on the carrier element in an overlapping arrangement, at least in sections. Each joint element can include two rod-shaped web portions arranged on the carrier element and extending therefrom which are arranged either converging or diverging relative to each other, and at their end facing away from the carrier element are connected to each other by way of a contact portion. Two web portions connected to each other extend in a first common plane and two other web portions connected to each other extend in a second common plane, and the first common plane and the second common plane intersect.

11 Claims, 3 Drawing Sheets

Figure 1:
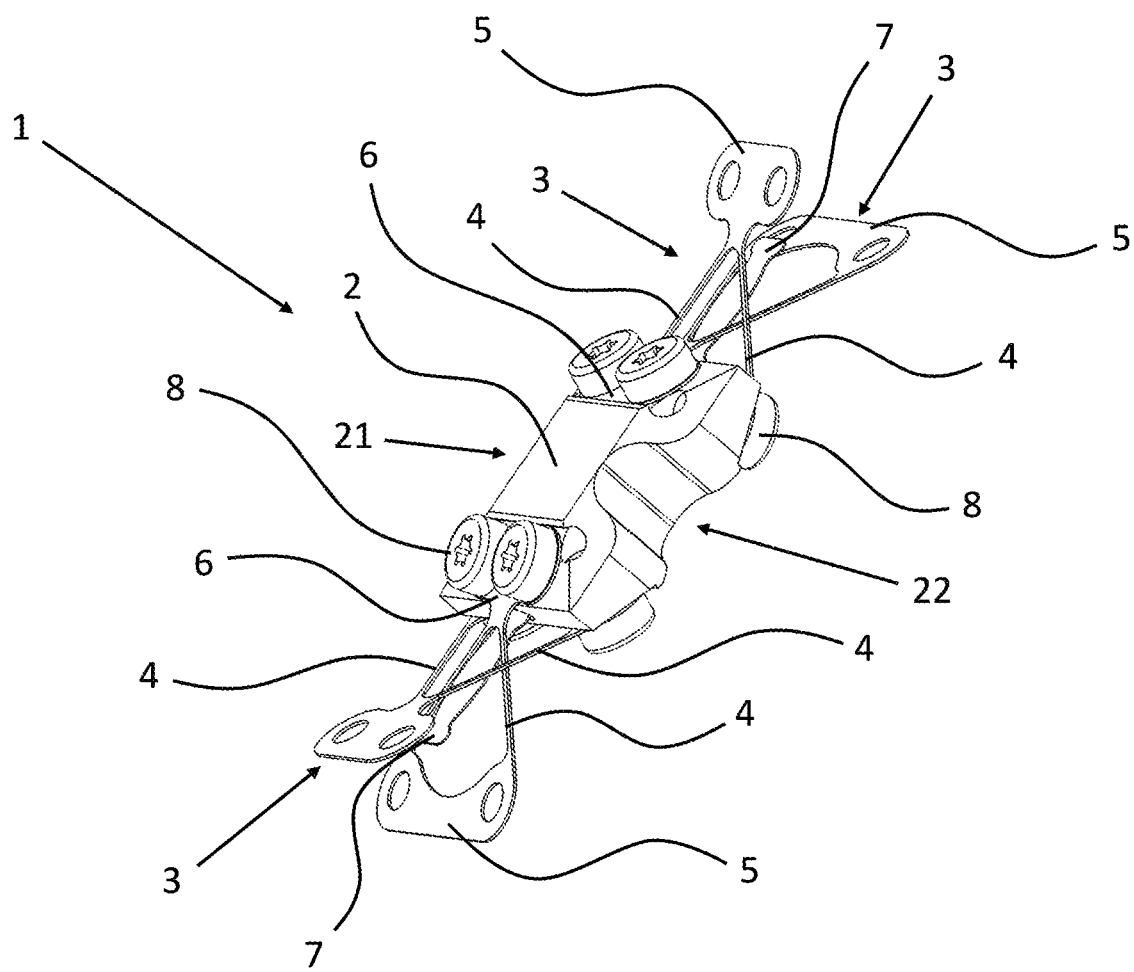

(58) Field of Classification Search
CPC ...... Y10T 403/45; Y10T 403/54; F16C 11/04; F16C 11/12; B25J 9/0015; B25J 9/0078
See application file for complete search history.

(56) References Cited

U.S. PATENT DOCUMENTS

| | | | |
|---|---|---|---|
| 3,332,255 A | 7/1967 | Seagreaves et al. | |
| 3,465,997 A * | 9/1969 | Piske | F16C 11/12 248/619 |
| 3,685,314 A * | 8/1972 | Flannelly | F16C 11/12 464/84 |
| 4,261,211 A * | 4/1981 | Haberland | F16D 3/005 403/291 |
| 4,285,214 A * | 8/1981 | Bochan | F16D 3/005 464/119 |
| 4,516,958 A * | 5/1985 | Phillips | F16D 3/005 464/147 |
| 4,607,492 A * | 8/1986 | Demus | F16C 29/00 267/164 |
| 4,751,868 A * | 6/1988 | Paynter | B62D 57/032 92/92 |
| 4,834,690 A * | 5/1989 | Ueno | F16D 3/74 464/84 |
| 5,040,626 A * | 8/1991 | Paynter | B25J 19/0029 92/48 |
| 5,392,662 A * | 2/1995 | Jadrich | F16H 25/24 403/220 |
| 5,445,471 A * | 8/1995 | Wexler | F16C 11/12 16/280 |
| 5,611,714 A | 3/1997 | Krivec | |
| 6,870,632 B2 * | 3/2005 | Petasch | G02B 7/023 356/614 |
| 7,296,481 B2 | 11/2007 | Kahle et al. | |
| 7,878,665 B2 * | 2/2011 | Imoto | G02B 7/022 353/100 |
| 2001/0022917 A1 | 9/2001 | Genequand | |
| 2006/0169053 A1 | 8/2006 | Kahle et al. | |
| 2011/0188926 A1 | 8/2011 | Stratton | |
| 2013/0308997 A1 | 11/2013 | Smith | |
| 2014/0147193 A1 | 5/2014 | Baudasse | |
| 2020/0008827 A1 * | 1/2020 | Dearden | B25J 15/0233 |

FOREIGN PATENT DOCUMENTS

| | | |
|---|---|---|
| CN | 104791377 A | 7/2015 |
| DE | 69703871 T2 | 8/2001 |
| DE | 102014002182 A1 | 8/2015 |
| DE | 102014006727 B3 | 10/2015 |
| FR | 2959689 A1 | 11/2011 |
| JP | S 46-000762 B | 1/1971 |

OTHER PUBLICATIONS

Office Action (Notice of Grounds of Rejection) dated Jan. 5, 2021, by the Japanese Patent Office in corresponding Japanese Patent Application No. 2019-572183, and an English Translation of the Office Action. (4 pages).

International Search Report (PCT/ISA/210) and translation and Written Opinion (PCT/ISA/237) dated Sep. 13, 2018, by the European Patent Office as the International Searching Authority for International Application No. PCT/DE2018/100611.

Office Action (Notice of Preliminary Rejection) dated Mar. 15, 2021, by the Korean Patent Office in corresponding Korean Patent Application No. 10-2020-7003224, and an English Translation of the Office Action. (7 pages).

* cited by examiner

JOINT

The invention relates to a joint and a parallel-kinematic adjustment device with at least one such joint.

Publication US 2014/0 147 193 A1 describes a Cardan joint with two flexible frame elements arranged orthogonally to each other, where the frame elements are connected to each other by flexure joints.

A flexure joint is known from DE 10 2014 006 727 B3 with two bearing elements arranged pivotable about an axis of rotation and are connected to each other by way of spring elements. According to the invention, a spiral or helical spring element is arranged between the two bearing elements.

DE 10 2014 002 182 A1 teaches a two-axis deflectable monolithic flexure joint with two pairs of oppositely disposed bending cross springs which are connected to each other by webs.

DE 697 03 871 T2 relates to a flexible planar pivot joint with intersecting leaves, where the leaves are each configured to be formed integrally with a connection element.

US 2011/0 188 926 A1 describes a joint in which the two elements movable relative to each other are connected to each other by way of intersecting annular web portions.

Further known from general prior art are ball joints in which a ball head is mounted in a complementary shaped ball socket. Such ball joints enable turning or rotational motions about all three spatial axes.

The main drawback of the ball joints known from general prior art is the existence of a breakaway moment which must first be overcome for moving, i.e. for pivoting or twisting, the ball joint. This breakaway moment is due to the fact that, in the friction pairing of the ball head and ball socket in the motionless state, friction exists between the ball head and the ball pan with a coefficient of friction which is higher than the coefficient of sliding friction which is predominant in a relative motion between the ball head and the ball socket. In order to achieve the regime of the friction coefficient, a certain force, which is substantially determined by the coefficient of static friction, must therefore first be overcome.

Such a breakaway moment is particularly disadvantageous where adjustment motions with high resolution and accuracy are to be realized when using the ball joint, for example, in the case of an adjustment device. In addition, the breakaway moments have a detrimental effect on the wear of the friction pairing of the ball head and the ball socket. Increased wear results in reduced positioning accuracy for positioning applications, and the corresponding wear particles can cause respective contamination problems in certain applications, such as cleanroom adjustment devices.

it is therefore the object of the invention to provide a joint with at least three degrees of rotational freedom, i.e. with the functionality of a ball joint, in which the breakaway moment is completely or largely eliminated and which can at the same time be realized in a simple and inexpensive manner.

The term "substantially", used in the entire following part of the description in the context of the specification of geometric data such as angles, dimensions, positions, orientations or directions, shall be understood as meaning that the corresponding geometric data can have a deviation of +/−5% relative to the geometric date respectively specified, where this deviation is due, for example, to manufacturing or assembly tolerances.

The joint according to the invention comprises a rigid carrier element and at least two elastically deformable joint elements formed on the carrier element in an overlapping arrangement, at least in sections. Each of the joint elements comprises two rod-shaped web portions arranged on the carrier element and extending therefrom. The two rod-shaped web portions of a joint element each extend such that they are arranged either extending toward each other, i.e. converging relative to each other, or that they are arranged moving away from each other, i.e. diverging relative to each other.

The two web portions of a joint element at their end facing away from the carrier element are connected to each other via a contact portion. Two web portions connected via the respective contact portion extend in a first common plane or define a first common plane, respectively, and the other two web portions connected to each other via the respective contact portion extend in a second common plane or define a second common plane, respectively, where the first common plane and the second common plane intersect, i.e. the first common plane and the second common plane are not arranged in parallel with each other It can be advantageous to have the web portions of one joint element extend at least in sections between the web portions of the other joint element. An intersecting arrangement of the web portions of the two joint elements is therefore comparatively easy to realize.

It can also be advantageous to have the contact portion be formed integrally with the two associated rod-shaped web portions. This accomplishes a reduction of the parts of the joint, so that the assembly of the joint is simplified and can be realized more quickly and inexpensively, respectively.

Furthermore, it can be advantageous to have the two web portions of a joint element at their end facing toward the carrier element be connected to each other via a fastening portion that is integrally formed with the web portions, and the respective joint element be connected to the carrier element via the fastening portion. This makes it particularly easy to attach the joint elements to the carrier element.

In addition, it can be advantageous to have the web portions of a joint element define an angle between them which is between 60 and 120°, and preferably between 70 and 95°.

In addition, it can be advantageous to have at least one elastically deformable carrier element be arranged on the support element. In this case, it is particularly advantageous to have the support element extend between the two joint elements in a direction facing away from the carrier element. With the aid of the support element, the web portions of the joint elements can be easily acted upon with a tensile force, so that a preload of the joint elements in the direction of extension of the joint arises.

In addition, it can be advantageous to have the joint comprise four joint elements arranged on the carrier element and two support elements arranged on the carrier element, where the joint elements are arranged in pairs at the oppositely disposed ends of the carrier element and the support elements are provided individually at the oppositely disposed ends of the carrier element. Due to the respective symmetrical structure of the joint, a largely identical flexibility about all degrees of rotational freedom is realized on both sides of the carrier element.

The invention also relates to a parallel-kinematic adjustment device with a fixed base and a platform that is adjustable relative to the base, where at least one joint is arranged as described above between the base and the platform.

It is presently particularly advantageous to use six joints, in which four joint elements and two support elements are each arranged on the carrier element, and where one drive element each is arranged at three joints—which define active joints—for individually driving the corresponding joint, and the three other joints—which define passive joints—are connected with one of their end portions to a common guide platform.

In this case, it can be advantageous to have the joints connected to the common guide platform be connected with their respective other end portion to an inner holding portion of the platform.

Embodiments of the invention shall be described below with reference to the appended figures, where FIG. 1: shows an embodiment of a joint according to the invention.

Figure 2:
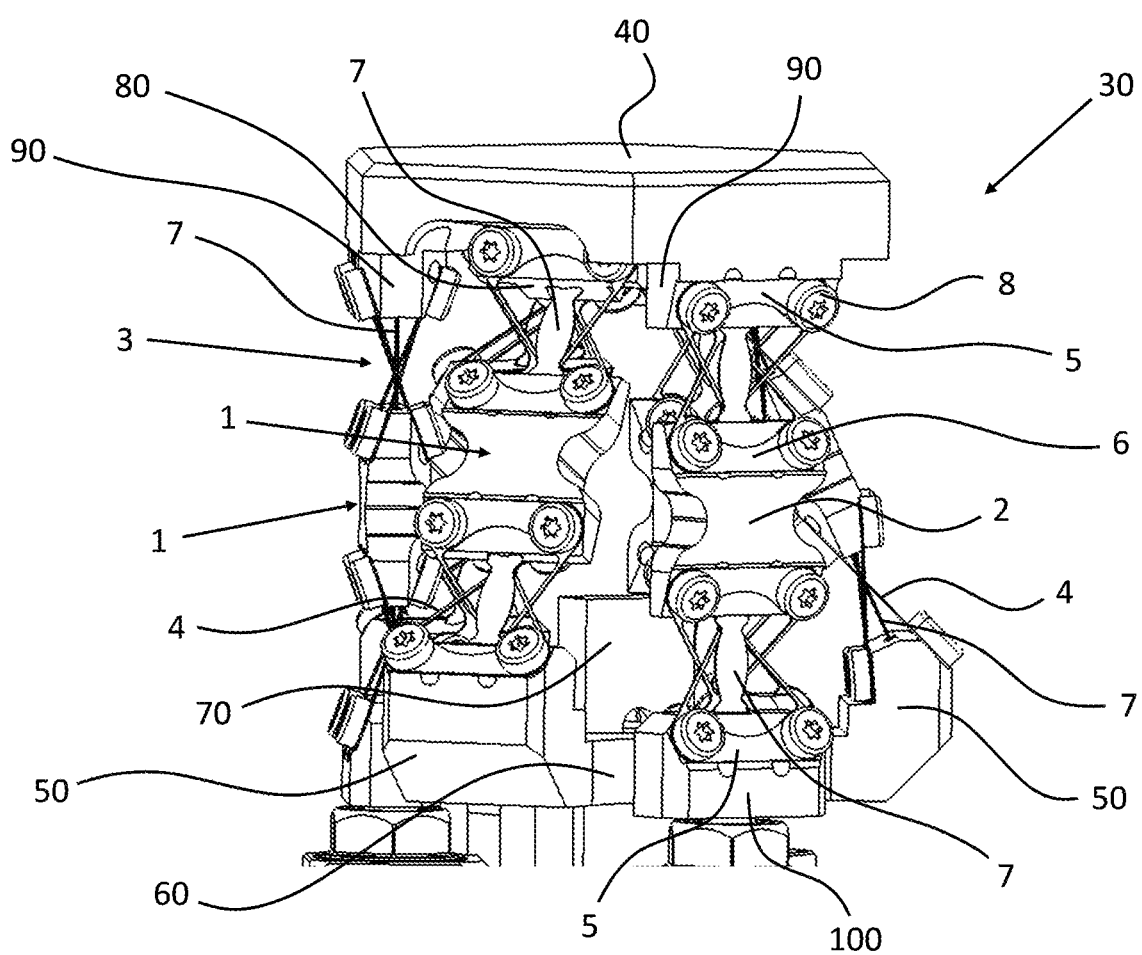

FIG. 2: shows an arrangement of the joint of the invention according to FIG. 1 in a parallel-kinematic adjustment device.

Figure 3:
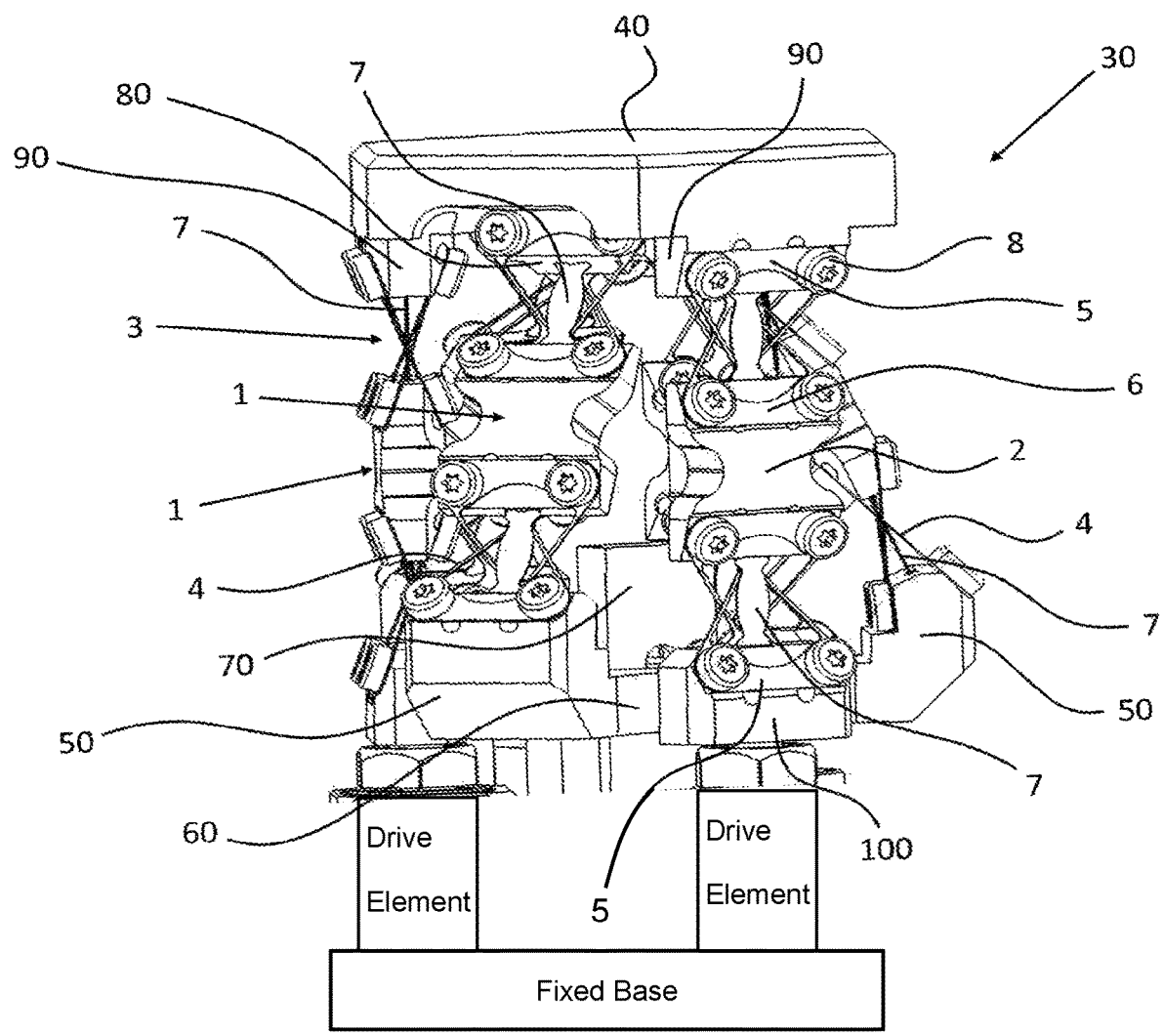

FIG. 3: shows an arrangement of the joint of the invention according to FIG. 1 in a parallel-kinematic adjustment device including a fixed base and drive elements.

FIG. 1 shows an embodiment of a joint according to the invention 1, in which a total of four elastically deformable joint elements 3 made of spring steel arranged on a substantially rigid carrier element 2 made of aluminum are present, where two joint elements 3 are arranged at a distal end of carrier element 2, while the other two joint elements 3 are arranged at the opposite distal end of carrier element 2. The joint elements are fabricated from spring steel, however, other materials having corresponding elastic deformability are equally conceivable for this purpose, for example bronze, which is non-magnetic and can be used where the joint according to the invention is used in a magnetic field. If only very small deflections of the joint or the joint elements are provided, the joint elements can also be made of a ceramic material.

The carrier element, which in addition to aluminum can be fabricated, for example, from other metal, such as steel, or also from ceramic, has a substantially rectangular shape, where the center region has a greater thickness and the carrier element tapers toward its both distal ends with respect to its thickness.

The two joint elements arranged at the same distal end of carrier element 3 each have a fastening portion 6 which is formed integrally or a as single piece with respective two web portions 4 of corresponding joint element 3. Fastening portion 6 and therefore corresponding joint element 3 is attached to carrier element 2 by way of two screws 8. Other types of connection such as soldering, welding or adhesive bonding are also conceivable. In addition, a single-piece or integrally formed configuration of web portions 4 with carrier element 2 while simultaneously omitting fastening portion 6 is additionally conceivable.

A respective joint element 3 is connected to carrier element 2 via fastening portion 8 at each of the two distal ends of carrier element 2 both at its upper side as well as at its underside.

With joint elements 3 in FIG. 1 arranged at the upper side of carrier element 2, two rod-shaped, elongated and flexible web portions 4 each extend starting out from fastening portion 6 in a direction facing away from the carrier element, where the two web portions 4 extend from a common center in the region of fastening portion 6 in oppositely facing directions from each other or in a divergent arrangement, respectively, and at their unattached end are connected to each other by way of a contact portion 5 that is formed integrally or as a single piece therewith.

The two web portions 4, connected to each other by way of contact portion 5, of a joint element 3 attached to the upper side extend within a first common plane, where this plane is arranged at an angle deviating from 0° relative to the plane defined by the upper side of carrier element 2.

Contact portion 5 comprises two circular breakthroughs which are provided to connect contact portion 5 and therefore joint 1, for example by way of screws, either to a fixed base or to an element to be moved that is mounted movable relative to a base by the joint.

The two web portions 4 of the joint element arranged at the upper side of the carrier element together with contact portion 5 form a triangle in the broadest sense, where the web portions represent the legs and the contact portion forms the base. It is conceivable that the length of the joint elements and the length of the contact portion match, so that an equilateral triangle is thus formed by the joint elements and the contact portion.

In joint elements 3 in FIG. 1 arranged at the underside of carrier element 2, two rod-shaped, elongated and flexible web portions 4 each extend starting out from fastening portion 6 in a direction facing away from the carrier element, where the two web portions 4 extend from a position in the region of fastening portion 6 that is at different locations or spaced apart in directions extending towards each other or in a convergent arrangement, respectively, and at their unattached end are connected to each other by way of a contact portion 5 that is formed integrally or as a single piece therewith.

The two web portions 4, connected to each other by way of contact portion 5, of a joint element 3 attached to the underside extend within a second common plane which differs from the first common plane in which the web portions, arranged at the same distal end of the carrier element, of the joint element attached at its upper side extend and where the second common plane is arranged at an angle deviating from 0° relative to plane defined by the underside of carrier element 2

Also respective contact portion 5 of the joint elements attached to the underside of the carrier element comprises two circular breakthroughs, which are likewise provided to connect contact portion 5 and therefore joint 1, for example by way of screws, either to a fixed base or to an element to be moved that is mounted movable relative to a base by the joint.

The two web portions 4 of the joint element arranged at the underside of the carrier element together with fastening portion 6 form a triangle in the broadest sense, where the web portions represent the legs and the fastening portion forms the base. It is conceivable that the length of the joint elements and the length of the fastening portion match, so that an equilateral triangle is thus formed by the joint elements and the fastening portion.

The first common plane, in which the web portions of a joint element arranged at a distal end of the carrier element extend, and there at its upper side, differs from the second common plane, in which the web portion of an element arranged at the same distal end of the carrier element extend, and there at its underside. In other words, the first common plane and the second common plane are not disposed parallel to each other, so that the first and second common planes intersect or cross each other. This is realized specifically in that web portions 4 of the joint element arranged at the upper side diverge, whereas the web portions of the joint element arranged at the underside converge, where in the region of the crossing of the respective web portions, the distance between the two web portions of one joint element differs from the distance between the two web portions of the other joint element. This means that the web portions of the joint element arranged at the upper side of the carrier element in sections, i.e. in the region of the crossing, extend between the web portions of the joint element arranged at the underside of the carrier element, so that both web portions of the joint element arranged at the upper side of the carrier element penetrate through the triangle formed by the two web portions of the joint element arranged at the underside of the carrier element together with its fastening portion.

Contact portion 5 does not necessarily have to be configured to be formed integrally or as a single piece with the respective web portions connected via the former. It is also conceivable that contact portion 5 represents a separate part of the joint, which is connected to be releasable, for example by way of screws, or inseparable, for example by adhesive bonding, soldering or welding, to the respective web portions.

An elastically deformable support element 7 is respectively arranged at both distal ends of carrier element 2. The respective support element is there inserted with one of its end portions into a corresponding recess of the carrier element and attached there by way of a clamping connection. Other types of attachment, such as screwing or adhesive bonding, are also conceivable.

The support element extends with its elongated shape in a direction facing away from the carrier element and at its free end comprises a broadening end portion, where the free end portion is provided for engagement with a higher-level structure in which the joint according to the invention is used, preferred by way of a clamping connection. By connecting the support element to the higher-level structure, this support element is to be acted upon with a compressive force, and this compressive force causes a tensile force load of the joint elements and in particular a corresponding preload of the web portions in a direction that corresponds substantially to the direction of extension of the carrier element or joint, respectively.

FIG. 2 shows an arrangement or use, respectively, of the joint of the invention according to FIG. 1 in a hexapod-like, parallel-kinematic adjustment device 30. The latter comprises a platform 40 which can be tilted about two axes extending perpendicular to each other and which is linearly slideable along a further axis and with which a total of six joints 1 according to the invention are each attached by way of a screw connection. Platform 30 is movable or tiltable relative to a fixed base, not shown in FIG. 2.

Each of the six joints 1 comprises four joint elements 3 arranged on carrier element 2 and two support elements 7 arranged on the carrier element, where joint elements 3 are arranged in pairs at the oppositely disposed ends of carrier element 2 and support elements 7 are provided individually at the oppositely disposed ends of e carrier element 2.

Three of the six joints 1 are aligned substantially perpendicular to platform 40, while the remaining three joints are arranged inclined relative to platform 40. At their end facing away from the platform, drive elements, unrecognizable in FIG. 2, are arranged at joints 1 aligned or arranged substantially perpendicular to platform 40 and are used to move the respective joints in the direction toward the platform or in the respective opposite direction. These three joints moved actively by drive elements therefore represent actively moved joints (hereinafter also referred to as active joints). The three other joints arranged inclined to the platform, however, are not connected to drive elements and are not actively moved, but only indirectly or passively due to the motion of the actively moved joints (hereinafter also referred to as passive joints).

The passive joints or their corresponding contact portions 5, respectively, are each connected with their end facing away from the platform to a contact element 50 by way of a screw connection. Contact element 50 itself is connected to a guide platform 60. Guide platform 60 is in engagement via a corresponding recess, unrecognizable in FIG. 2, with a guide element 70 which protrudes through the recess in the guide platform. A linear guide of the guide platform in its motion towards platform 40 is thus accomplished.

At their end facing platform 40, passive joints 1 are attached with their respective contact portions 5 by way of a screw connection to a common inner holding portion 80 of platform 40, where inner holding portion 88 is formed integrally or as a single piece with the platform. This inner holding portion 80 is located substantially at the center of platform 40, and the three passive joints are therefore substantially aligned toward the center of platform 40 or their directions of longitudinal extension extend towards the center of platform 40, respectively.

The passive joints are there used primarily to guide the platform when it tilts in two tilting axes extending perpendicular to each other, where the intersection of the tilting axes defines the so-called pivot point. The tilting axes or the pivot point, respectively, are ideally located outside the parallel-kinematic adjustment device, namely on the surface of the object to be adjusted, for example, a mirror. Other positions or locations of the pivot point, for example, within platform 40, are also conceivable, where the position or location of the pivot point can be adjusted by way of the distance of the passive joints to each other or by way of the inclination angle of the passive joints, respectively, i.e. the angle which the passive joints define with the platform or the base, respectively.

Support element 7 of a joint that is facing platform 40 engages in a corresponding recess of inner holding portion 80, while support element 7 of a joint that is facing away from platform 40 engages in a corresponding recess of contact element 50. The two support elements 7 are each held in the corresponding recess by way of a clamping connection. Since the locations of attachment of the respective contact portion have a distance to the respective carrier element which is less than the length of the support element, the simultaneous arrangement of the support element in the recess of the contact element or the holding portion, respectively, results in an elastic compression of the support element which causes a tensile force load with respect to the joint elements and in particular their web portions. A corresponding preload of the web portions substantially in the direction of extension of the joint is thus accomplished.

The three joints that are actively moved by way of drive elements are arranged spaced from the guide platform and not connected thereto. Contact portions 5 of the active joints facing platform 40 are each connected by way of a screw connection to an associated outer holding portion 90 of platform 40, where also the in total three outer holding portions 9 are formed integrally or as a single piece with platform 40.

Contact portions 5 of the active joints facing away from platform 40 are each connected by way of a screw connection to an actuation portion 100 of the base of the parallel-kinematic adjustment device, where the associated drive element acting upon respective actuation portion 100 and not shown in FIG. 2 can act in such a way that it and thus also the joint arranged at the actuation portion is moved toward platform 40, and therefore either—in the case of a simultaneous motion of the joints and in the same direction toward the platform—a purely translational motion of the guide platform guided by way of the guide platform together with the guide element arises in a direction facing away from the base of the parallel-kinematic adjustment device, or—in the case that only one joint or only two joints are moved in the same direction or the joints are moved in the opposite direction, respectively—a tilting motion of the platform about the pivot point largely guided by way of the passive joints results.

Due to support elements 7 of joint 1 according to the invention, a comparatively high axial stiffness is obtained in the active joints, so that the force introduced by the drive elements into the respective active joint can be converted to an effective and largely loss-free adjustment motion of the platform.

On the other hand, the support elements of the passive joints provide a defined motion about the tilting axes and a stable position or location of the pivot point.

LIST OF REFERENCE NUMERALS

1 Joint
2 carrier element
21 upper side of the carrier element
22 underside of the carrier element
3 joint element
4 web portion
5 contact portion
6 fastening portion
7 support element
8 fastening element
30 parallel-kinematic adjustment device
40 platform
50 contact element
60 guide platform
70 guide element
80 inner holding portion
90 outer holding portion
100 actuation portion

The invention claimed is:

1. A joint, which has at least three degrees of rotational freedom, comprising:
a rigid carrier element;
a first and a second elastically deformable joint element formed on one end of said carrier element in an overlapping arrangement, at least in sections;
a third and a fourth elastically deformable joint element formed on an opposite end of the one end of said carrier element in an overlapping arrangement, at least in sections, where each of said first, second, third and fourth joint elements includes:
two rod-shaped web portions arranged on said carrier element and extending therefrom which are arranged either converging or diverging relative to each other; and
at their end facing away from said carrier element, a contact portion for connecting the two rod-shaped web portions to each other;
wherein the two rod-shaped web portions connected to each other, of the first joint element, extend in a first common plane, and the two rod-shaped web portions connected to each other, of the second joint element, extend in a second common plane, and the first common plane and the second common plane intersect,
wherein said two rod-shaped web portions of the first joint element, pass, at least in sections, between said two rod-shaped web portions of the second joint element and thereby penetrating the second common plane,
wherein said two rod-shaped web portions of at least one of the first and second joint elements at their end facing toward said carrier element are connected to each other via a fastening portion that is integrally formed with said two rod-shaped web portions, and said at least one of the first and second joint elements is connected to said carrier element via said fastening portion.

2. The joint according to claim 1, wherein for each of said first, second, third and fourth joint elements, said contact portion is formed integrally with said two rod-shaped web portions.

3. The joint according to claim 1, wherein said two rod-shaped web portions of at least one of the first, second, third and fourth joint elements define an angle between them which is between 60° and 120°.

4. The joint according to claim 1, comprising:
at least one elastically deformable support element arranged on said carrier element.

5. The joint according to claim 4, wherein said support element extends between said first and second joint elements in a direction facing away from said carrier element.

6. The joint according to claim 1,
wherein two elastically deformable support elements are arranged on said carrier element where said first, second, and said third and fourth joint elements are respectively provided in pairs and said two support elements are arranged individually at oppositely disposed ends of said carrier element.

7. A parallel-kinematic adjustment device comprising:
a fixed base;
a platform that is adjustable relative to said base; and
at least one joint according to claim 1 arranged between said base and said platform.

8. The parallel-kinematic adjustment device according to claim 7, wherein the at least one joint comprises six joints, and the parallel-kinematic adjustment device further comprising:
a drive element arranged on each of three of said six joints for individually driving the respective joint; and
a common guide platform connected to said three other of said six joints at one of their end portions.

9. The parallel-kinematic adjustment device according to claim 8, wherein said other three joints of the six joints that are connected to said common guide platform are connected with their respective other end portions to an inner holding portion of said platform.

10. The joint according to claim 1, wherein said two rod-shaped web portions of at least one of the first, second, third and fourth joint elements define an angle between them which is between 70° and 95°.

11. The joint according to claim 1, wherein the two rod-shaped web portions connected to each other, of the third joint element, extend in a third common plane, and the two rod-shaped web portions connected to each other, of the fourth joint element, extend in a fourth common plane, and the third common plane and the fourth common plane intersect,
wherein said two rod-shaped web portions of the third joint element, pass, at least in sections, between said two rod-shaped web portions of the fourth joint element and thereby penetrating the fourth common plane,
wherein said two rod-shaped web portions of at least one of the third and fourth joint elements at their end facing toward said carrier element are connected to each other via a fastening portion that is integrally formed with said two rod-shaped web portions, and said at least one of the third and fourth joint elements is connected to said carrier element via said fastening portion.

* * * * *